United States Patent [19]

Heinrich

[11] Patent Number: 5,036,933
[45] Date of Patent: Aug. 6, 1991

[54] SUPPLEMENTARY REAR-WHEEL STEERING FOR MOTOR VEHICLES

[75] Inventor: Christian Heinrich, Esslingen, Fed. Rep. of Germany

[73] Assignee: Mercedes-Benz AG, Stuttgart, Fed. Rep. of Germany

[21] Appl. No.: 415,602

[22] Filed: Oct. 2, 1989

[30] Foreign Application Priority Data

Oct. 1, 1988 [DE] Fed. Rep. of Germany ....... 3833421

[51] Int. Cl.$^5$ .............................................. B62D 7/14
[52] U.S. Cl. ..................... 180/140; 180/141; 60/573; 91/450; 92/86; 92/112
[58] Field of Search ............... 180/140, 141, 152, 153, 180/154; 60/571, 572, 573; 91/417 R, 444, 450; 92/86, 112

[56] References Cited

U.S. PATENT DOCUMENTS 3,168,013 2/1965 Williamson ........................... 92/112
3,948,343 4/1976 Malcolm ............................... 180/271

FOREIGN PATENT DOCUMENTS 964663  5/1957 Fed. Rep. of Germany ........ 91/444
0131876 6/1987 Japan ..................................... 280/91
0166162 7/1987 Japan ................................... 180/252
8904269 5/1989 PCT Int'l Appl. ................... 280/91

*Primary Examiner*—Charles A. Marmor
*Assistant Examiner*—Victor E. Johnson
*Attorney, Agent, or Firm*—Evenson, Wands, Edwards, Lenahan & McKeown

[57] ABSTRACT

In normal operation, a control or regulating device controls vehicle rear wheel steering in accordance with freely-selectable specifications. If a malfunction of the control or regulating device is detected, the latter becomes inoperative immediately. A piston-cylinder unit drivingly connected to the front wheel steering and a piston-cylinder unit drivingly connected to the rear wheel steering are simultaneously positively coupled to one another, with the result that the rear wheel steering is actuated positively via the front wheel steering.

20 Claims, 1 Drawing Sheet

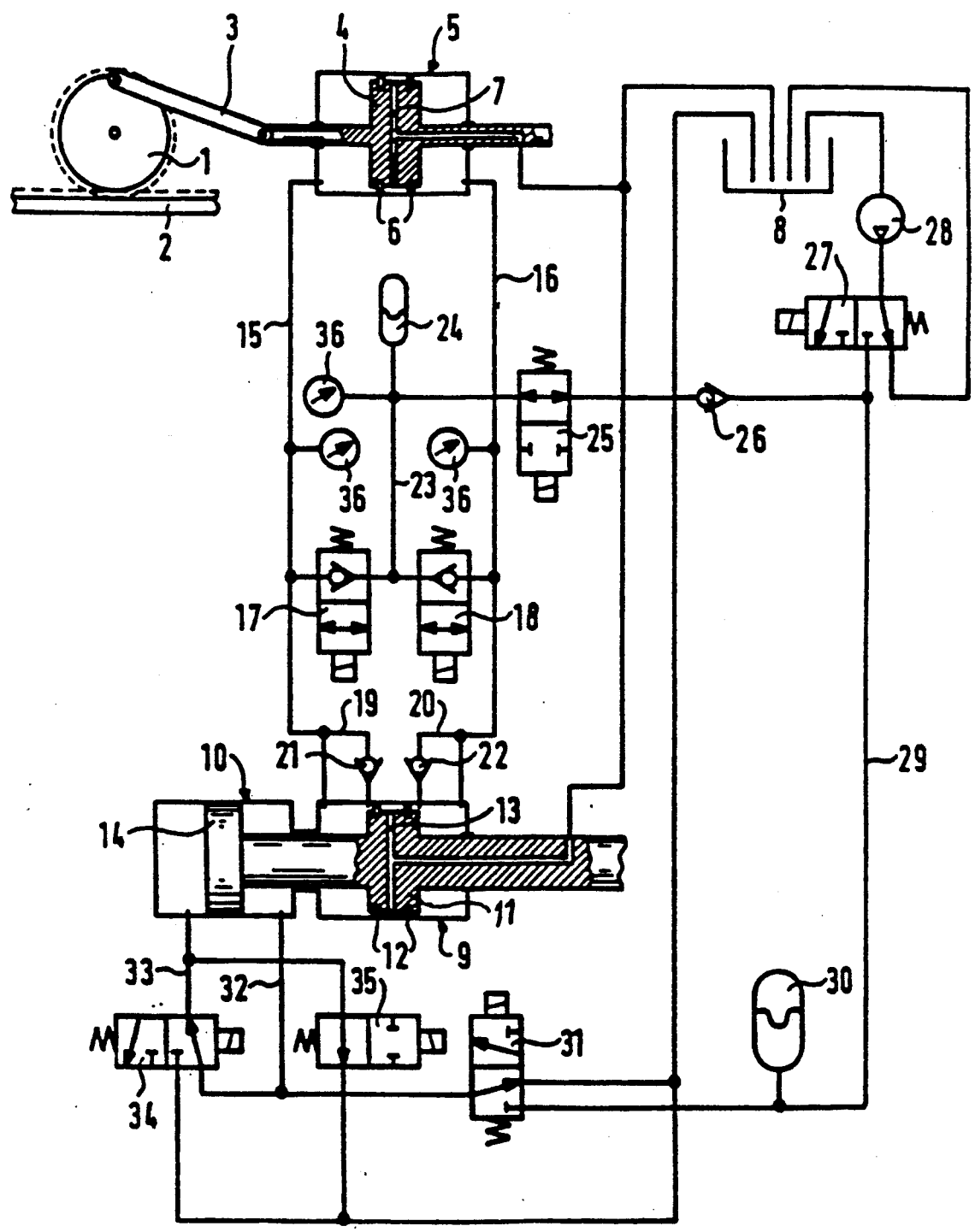

SUPPLEMENTARY REAR-WHEEL STEERING FOR MOTOR VEHICLES

BACKGROUND AND SUMMARY OF THE INVENTION

The invention relates to a supplementary rear-wheel steering for motor vehicles having a control or regulating device which actuates the steering of the rear wheels as a function of the steering angle of the manually-controlled front steering wheels (main steering) by means of a servomotor, servo-assisted by a double-acting piston-cylinder unit and as a function of further parameters (e.g. transverse acceleration, and/or travelling speed of the vehicle, and/or by comparison of set and actual values of the rear wheel steering angle).

Supplementary rear-wheel steering systems of this general kind are in principle known from Japanese Published Specification 62-199 568.

To facilitate maneuvering operations, the rear wheels can be deflected in the opposite direction to the front wheels during very low travelling speeds in order to reduce the turning circle of a vehicle.

At higher travelling speeds, provision is made to deflect the rear wheels in the same direction as the front wheels but with a clearly smaller steering angle, in order to increase the slip angle of the rear wheels at the very beginning of cornering and thereby improve directional stability.

It is in addition fundamentally known to control the supplementary rear-wheel steering as a function of additional parameters in order, for example, to automatically mitigate effects of side winds or also swerving movements of the vehicle.

In the case of such highly developed supplementary rear-wheel steering systems, a computer control is very often necessary. However, in the case of a malfunction of the computer, it must be possible to make a switch to a computer-independent emergency control function for the rear-wheel steering. In this connection, the automatic return of the rear wheels to their neutral central position as soon as a malfunction of the computer is detected has been envisaged.

However, this concept has the considerable disadvantage that an extremely critical driving situation may occur in certain circumstances, if the returning of the rear wheels is effected in driving situations within the threshold region of the controllability of the vehicle. Furthermore, the driver may be dangerously surprised, by a sudden returning of the previously deflected rear wheels to the central position even in driving situations which are not dangerous per se.

It is therefore the object of the invention to create a supplementary rear-wheel steering which, in the event of a failure or a malfunction of the computer-controlled control (regulating device) guarantees particularly high driving safety in a manner which is simple in terms of construction.

This object is achieved by having a steering linkage element of the rear wheel steering coupled to a further double-acting hydraulic piston-cylinder unit and by having the piston-cylinder units of the front wheel steering and of the rear-wheel steering identical with respect to their swept volumes. Two separate lines are arranged between the two piston-cylinder units to connect the chambers of the two piston-cylinder units directly to one another. A further connection is established between the two lines by a valve which is open only while the control or regulating device is operating correctly and in the case of control malfunction, the valve closes and couples the piston-cylinder unit of the rear-wheel steering to the piston-cylinder unit of the front-wheel steering, while the servomotor of the rear wheel steering simultaneously switches over to a self-locking-free state.

The invention is based on the general idea of effecting a hydraulic positive coupling between front wheel and rear wheel steering in the event of an error detection in the system of the regulating control. At the same time, the fact that the swept volumes of the two piston-cylinder units are the same, ensures that the rear wheel steering can be actuated over the maximum possible steering range of the rear wheels when the piston of the further piston-cylinder unit, associated with the main steering, is moved from one extreme position to the other.

A particular advantage of the invention consists in the fact that when the positive coupling between front-wheel and rear-wheel steering comes into effect, an independent steering movement of the rear wheels, which would under certain circumstances be extremely unexpected, does not take place. Rather, the rear wheels are from then on only steered together with the front wheels.

If the positive coupling between front-wheel steering and rear-wheel steering takes place at a time at which exact synchronism between front wheels and rear wheels does not exist and, accordingly, the vehicle could only follow a straight road by running as it were askew (where the longitudinal axis of the vehicle is slightly oblique to the driving direction), then synchronism is obtained by having two bypasses of the front-wheel steering being actuated in such a way that the piston of the further piston-cylinder unit reaches an extreme position.

Here, it is necessary to steer to the left if, in straight-ahead travel while askew, the longitudinal axis of the vehicle points to the right in the driving direction. In the opposite case, it is necessary to steer to the right. If the driver does not take account of this, complete synchronism can be enforced by steering strongly in one direction and then strongly in the other direction in succession. The front and rear wheels thereupon each simultaneously assume their neutral central position, i.e. a slip-free straight-ahead travel. Then the longitudinal axis of the vehicle will lie in the driving direction.

The servo-motor can have its output and input be set to the unpressurized condition by means of valves which connect the inputs and outputs to a reservoir and which switch over automatically upon error detection in the regulating control so as to be freely moveable, i.e., in a self-locking free state.

It is also advantageous to keep the two piston-cylinder units and the line system between the latter permanently under pressure in order to be able to detect immediately any leaks by means of continuously operating pressure transducers located in these lines.

Additional auxiliary control of the servo-motor controlling rear-wheel steering is obtained by applying pressure or venting of the servo-motor when malfunction conditions do not exist.

Other objects, advantages and novel features of the present invention will become apparent from the following detailed description of the invention when considered in conjunction with the accompanying drawings.

BRIEF DESCRIPTION OF THE DRAWING

The FIGURE shows the steering system according to the invention in a schematized circuit-diagram-like representation.

DETAILED DESCRIPTION OF THE DRAWINGS

The front-wheel steering of the vehicle is actuated manually by means of a steering handwheel (not shown) which drives a rack 2 which is, via a steering gear (likewise not shown), connected to a mechanism 1 to drive a crank assembly 3. The crank assembly 3 is drivingly connected to the piston 4 of a double-acting piston-cylinder unit 5 which is displaced from one end position into the other end position when the crank assembly 3 is displaced from one (for example, right-hand) extreme position into the other (for example, left-hand) extreme position. The piston-cylinder unit 5 is of symmetrical design, i.e. when the piston 4 is displaced, the amount by which the volume of one chamber is reduced corresponds to the amount by which the other chamber of the unit 5 is increased. A line 7 which leads outwards from the piston periphery between piston seals 6 is connected to a reservoir 8 for hydraulic medium.

The steering linkage of the supplementary rear-wheel steering (not shown) is drivingly connected to two piston-cylinder units 9 and 10 whose pistons are accommodated coaxially to one another in a common housing.

The piston-cylinder unit 9 is of symmetrical design, wherein when the piston 11 is displaced, the amount by which the volume of one chamber is reduced is equal to that by which the volume of the other chamber is increased. A line 13 leads outwards from the piston periphery and between the piston seals 12 to the reservoir 8. The piston-cylinder unit 9 has the same swept volume as the piston-cylinder unit 5.

The piston-cylinder unit 10 is of unsymmetrical design, in that the cross-sectional area of the piston 14 is twice as large as the cross-sectional area of the piston rod. The effective surface of the piston 14, acted upon by the pressure in the left-hand chamber of the piston-cylinder unit 10, is twice as large as that in the right-hand annular chamber.

Lines 15 and 16 connect the chambers of the piston-cylinder unit 5 with those of the piston-cylinder unit 9. Valves 17 and 18 connect these two lines 15 and 16 when switched over from the locking position illustrated and into their open position.

Bypasses 19 and 20 and non-return valves 21 and 22 are arranged in parallel to the lines 15 and 16 at the piston-cylinder unit 9. The openings of the bypasses 19 and 20 into the piston-cylinder unit 9 are controlled by the piston 11. As soon as the piston 11 reaches its right-hand end position, the left-hand chamber of the piston-cylinder unit 9 is connected into the right-hand chamber of the latter because the non-return valve 22 opens in this direction of flow. If the piston 11 is pushed into its left-hand end position, the bypass 19 provides a flow from the right-hand chamber of the piston-cylinder unit 9 into its left-hand chamber because the non-return valve 21 opens in this direction of flow. In intermediate positions of the piston 11, the bypasses 19 and 20 are inoperative.

An accumulator 24 is connected between the valves 17 and 18 by a line 23. In the locking position illustrated, these valves operate as non-return valves opening towards the lines 15 and 16 respectively. Line 23 also leads to a change-over valve 27 via a shut-off valve 25 and a non-return valve 26. In the position illustrated, the change-over valve 27 uncouples the line 23 from a hydraulic pump 28. In the other position of the change-over valve 27, the line 23 can be connected to the delivery side of the pump 28, provided that the shut-off valve 25 is in the open position illustrated.

A line 29 connects the delivery side of the hydraulic pump 28 to an accumulator 30 via the change-over valve 27. The line 29 leads to a change-over valve 31 which, in its illustrated position, blocks the line 29 and simultaneously connects line 32, opening into the right-hand chamber of the piston-cylinder unit 10, to the reservoir 8. In its other position, the change-over valve 31 connects lines 29 and 32.

A line 33 connects the left-hand chamber of the piston-cylinder unit 10 to the line 32 via valve 34 in the position shown. In the other position of the control valve 34, the line 33 is connected to the reservoir 8. The line 33 can be connected to the reservoir 8 via a shut-off valve 35. In the position contrary to that shown, the shut-off valve 35 connection of line 33 to the reservoir 8 is closed and the only possible connection would be via the control valve 34.

Valves 17, 18, 31 and 35 have a safety function and move into the positions illustrated in response to spring force as soon as the electric actuating elements of these valves are de-energized. In the current-carrying condition of the actuating elements, the valves 17, 18, 31 and 35 each assume the opposite position to that shown.

This latter unshown position is the position which establishes itself in normal operation and when a control or regulating device (not illustrated) for the supplementary rear-wheel steering is operating in error-free fashion.

To actuate the supplementary rear-wheel steering, the control or regulating device controls the change-over valve 27 and the proportional or control valve 34. The change-over valve 27 is here used to control or regulate the pressure in accumulator 30. The position of the piston 14 and thus the steering position of the rear wheels is controlled via control valve 34.

In normal operation, the piston-cylinder unit 9 is inoperative because the valves 17 and 18 assume their open position and accordingly connect the lines 15 and 16 to one another, with the result that the pistons 4 and 11 of the piston-cylinder units 5 and 9 can be moved completely independently of one another since both sides of both piston units are connected.

Thus, in normal operation, the control or regulating device can actuate the supplementary rear-wheel steering as a function of any desired parameters by actuating the change-over valve 27 or 31 and the control valve 34 according to any desired steering laws.

The control or regulating device checks itself constantly for error-free functioning. If any error should occur, the actuating elements of the valves 17, 18, 31 and 35 are immediately switched to the de-energized condition, with the result that these valves drop into the illustrated positions associated with emergency operation.

The piston-cylinder unit 10 hence becomes inoperative immediately because its two chambers are constantly connected to the reservoir 8 via the valves 31 and 35, irrespective of the position of the control valve 34.

A hydraulic positive coupling between the piston-cylinder units 5 and 9 is simultaneously effected since the lines 15 and 16 are separated from one another by the valves 17 and 18, which assume the positions illustrated.

Thus, rear-wheel steering is accordingly actuated simultaneously with the front-wheel steering.

If rear-wheel and front-wheel steering are not set exactly to synchronism, i.e. if the pistons 4 and 11 of the piston-cylinder units 5 and 9 do not assume their central position simultaneously, it suffices to lock the steering manually in a direction in which the piston 11 of the piston-cylinder unit 9 reaches one end position before the piston 4 of piston-cylinder unit 5. If the steering now continues to be actuated in that direction, the piston 4 of piston-cylinder unit 5 can also reach that end position (which is associated with the end position already assumed by the piston 11 of piston-cylinder unit 9), since the bypasses 19 and 20 and their non-return valves 21 and 22 allow (in the end positions of the piston 11) hydraulic medium to flow from the larger chamber of the piston-cylinder unit 9 into the smaller chamber of the latter in each case.

Thus, as soon as the piston 4 of the piston-cylinder unit 5 has reached its end position, synchronism is established between the piston-cylinder units 5 and 9.

Accordingly, there can be no occurrence of the vehicle running askew in straight-ahead travel.

The hydraulic system between the piston-cylinder units 5 and 9 can be continuously checked for leaks. With shut-off valve 25 opened and with valve 27 appropriately switched over, lines 15 and 16 and the piston-cylinder units 5 and 9 connected thereto, can be connected to the delivery side of the hydraulic pump 28, with the result that accumulator 24 is correspondingly stressed. The shut-off valve 25 is then closed. The pressure drop and hence the magnitude of any leak can now be determined by means of pressure sensors 36. Since the spaces between the piston seals 6 and 12 of the piston-cylinder units 5 and 9 are kept unpressurized by the lines 7 and 13 leading to the reservoir, a leak in one of the piston seals 6 and 12 respectively also leads to a pressure drop. This is equivalent to saying all the piston seals 6 and 12 are perfect as long as no pressure drop occurs.

The mechanism 1 drivingly connecting the fron-wheel steering rack 2 to the piston 4 of the piston-cylinder unit over the crank assembly 3 is designed in such a way that as the piston 4 is displaced out of its central position into the right-hand or left-hand extreme position when the front-wheel steering is deflected to the right or to the left by a limited amount. Here, steering is actuated within a central range. In emergency operation, the rear wheels can then be deflected in the same direction as the front wheels within this central range, but with reduced steering angles compared to the front wheels. If the front wheels are deflected even further, provision can be made—depending on the design of the mechanism 1—for the piston 4 to remain stationary or to be moved in the direction of its other extreme position. Accordingly, in emergency operation, the rear wheels can then retain their maximum steering lock (to the right or to the left) without further steering movement when the front wheels are steered beyond the central range. In other cases, the rear wheels can execute a steering movement opposite to that of the front wheels, when the front wheels are deflected beyond the central range to the right or to the left.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A supplementary rear-wheel steering for a motor vehicle having a servo-motor and a regulating control for actuating rear-wheel steering as a function of a steering angle of a manually-controlled front-wheel steering and as a function of further parameters including at least one of transverse acceleration, travelling speed of the vehicle, and comparison of set and actual values of a rear-wheel steering angle, comprising:

one of a steering linkage and control element of the front-wheel steering coupled to a first double-acting hydraulic piston-cylinder unit;

one of a steering linkage and control element of the rear-wheel steering coupled to a second double-acting hydraulic piston-cylinder unit, said first and second piston-cylinder units of the front-wheel steering and of the rear-wheel steering having identical swept volumes;

two separate lines operatively separate from the steering linkage and control element of the rear-wheel steering and directly connected between the first and second piston-cylinder units of the front and rear wheel steering, said two separate lines connecting respective chambers of the first and second piston-cylinder units directly to one another; and a further connection valve means connected between said two separate lines and operable to be open only while the regulation control is operating correctly wherein, upon malfunction of the regulating control, the valve means closes and couples the second piston-cylinder unit of the rear-wheel steering to the first piston-cylinder unit of the front steering, and simultaneously the servo-motor of the rear-wheel steering is switched over to a freely movable state.

2. Supplementary rear-wheel steering according to claim 1, wherein when a piston of the second piston-cylinder unit is in an end position, a bypass is open to connect two piston chambers of this piston-cylinder unit; and wherein said bypass has a non-return valve which only permits a flow from a larger to a smaller chamber of the piston-cylinder unit which relative sized chambers are created by movement of the piston to an end position.

3. Supplementary rear-wheel steering according to claim 1, wherein an output and an input of the servo-motor are connected to a reservoir through automatic valves means in the event of error detection in the regulating control.

4. Supplementary rear-wheel steering according to claim 1, wherein the two separate lines between the two piston-cylinder units are connectable to a test pressure source to provide a leakage indication.

5. Supplementary rear-wheel steering according to claim 2, wherein the two separate lines between the two piston-cylinder units are connectable to a test pressure source to provide a leakage indication.

6. Supplementary rear-wheel steering according to claim 3, wherein the two separate lines between the two piston-cylinder units are connectable to a test pressure source to provide a leakage indication.

7. Supplementary rear-wheel steering according to claim 1, wherein the pistons of the piston-cylinder units each have two axially spaced piston seals; and wherein a space between the piston seals is connected to a reservoir through fluid lines in each piston.

8. Supplementary rear-wheel steering according to claim 2, wherein the pistons of the piston-cylinder units each have two axially spaced piston seals; and wherein a space between the piston seals is connected to a reservoir through fluid lines in each piston.

9. Supplementary rear-wheel steering according to claim 3, wherein the pistons of the piston-cylinder units each have two axially spaced piston seals; and wherein a space between the piston seals is connected to a reservoir through fluid lines in each piston.

10. Supplementary rear-wheel steering according to claim 4, wherein the pistons of the piston-cylinder units each have two axially spaced piston seals; and wherein a space between the piston seals is connected to a reservoir through fluid lines in each piston.

11. Supplementary rear-wheel steering according to claim 5, wherein the pistons of the piston-cylinder units each have two axially spaced piston seals; and wherein a space between the piston seals is connected to a reservoir through fluid lines in each piston.

12. Supplementary rear-wheel steering according to claim 3, wherein the connection to the test pressure source is obtained through control means connected to a hydraulic pressure source, and wherein pressure sensors indicating a pressure loss caused by leakage are arranged in these lines.

13. Supplementary rear-wheel steering according to claim 4, wherein the connection to the test pressure source is obtained through control means connected to a hydraulic pressure source, and wherein pressure sensors indicating a pressure loss caused by leakage are arranged in these lines.

14. Supplementary rear-wheel steering according to claim 5, wherein the connection to the test pressure source is obtained through control means connected to a hydraulic pressure source, and wherein pressure sensors indicating a pressure loss caused by leakage are arranged in these lines.

15. Supplementary rear-wheel steering according to claim 1, wherein a piston of the piston-cylinder unit of the front-wheel steering is coupled to an actuating means of the front wheel steering, by a mechanism which, within a central range of the steering angle of the front wheel steering, brings about a deflection of rear wheels of the motor vehicle in the same direction as front steering wheels of the motor vehicle.

16. Supplementary rear-wheel steering according to claim 2, wherein a piston of the piston-cylinder unit of the front-wheel steering is coupled to an actuating means of the front wheel steering, by a mechanism which, within a central range of the steering angle of the front wheel steering, brings about a deflection of rear wheels of the motor vehicle in the same direction as front steering wheels of the motor vehicle.

17. Supplementary rear-wheel steering according to claim 3, wherein a piston of the piston-cylinder unit of the front-wheel steering is coupled to an actuating means of the front wheel steering, by a mechanism which, within a central range of the steering angle of the front wheel steering, brings about a deflection of rear wheels of the motor vehicle in the same direction as front steering wheels of the motor vehicle.

18. Supplementary rear-wheel steering according to claim 4, wherein a piston of the piston-cylinder unit of the front-wheel steering is coupled to an actuating means of the front wheel steering, by a mechanism which, within a central range of the steering angle of the front wheel steering, brings about a deflection of rear wheels of the motor vehicle in the same direction as front steering wheels of the motor vehicle.

19. Supplementary rear-wheel steering according to claim 5, wherein a piston of the piston-cylinder unit of the front-wheel steering is coupled to an actuating means of the front wheel steering, by a mechanism which, within a central range of the steering angle of the front wheel steering, brings about a deflection of rear wheels of the motor vehicle in the same direction as front steering wheels of the motor vehicle.

20. Supplementary rear-wheel steering according to claim 6, wherein a piston of the piston-cylinder unit of the front-wheel steering is coupled to an actuating means of the front wheel steering, by a mechanism which, within a central range of the steering angle of the front wheel steering, brings about a deflection of rear wheels of the motor vehicle in the same direction as front steering wheels of the motor vehicle.

* * * * *